Figure 1:
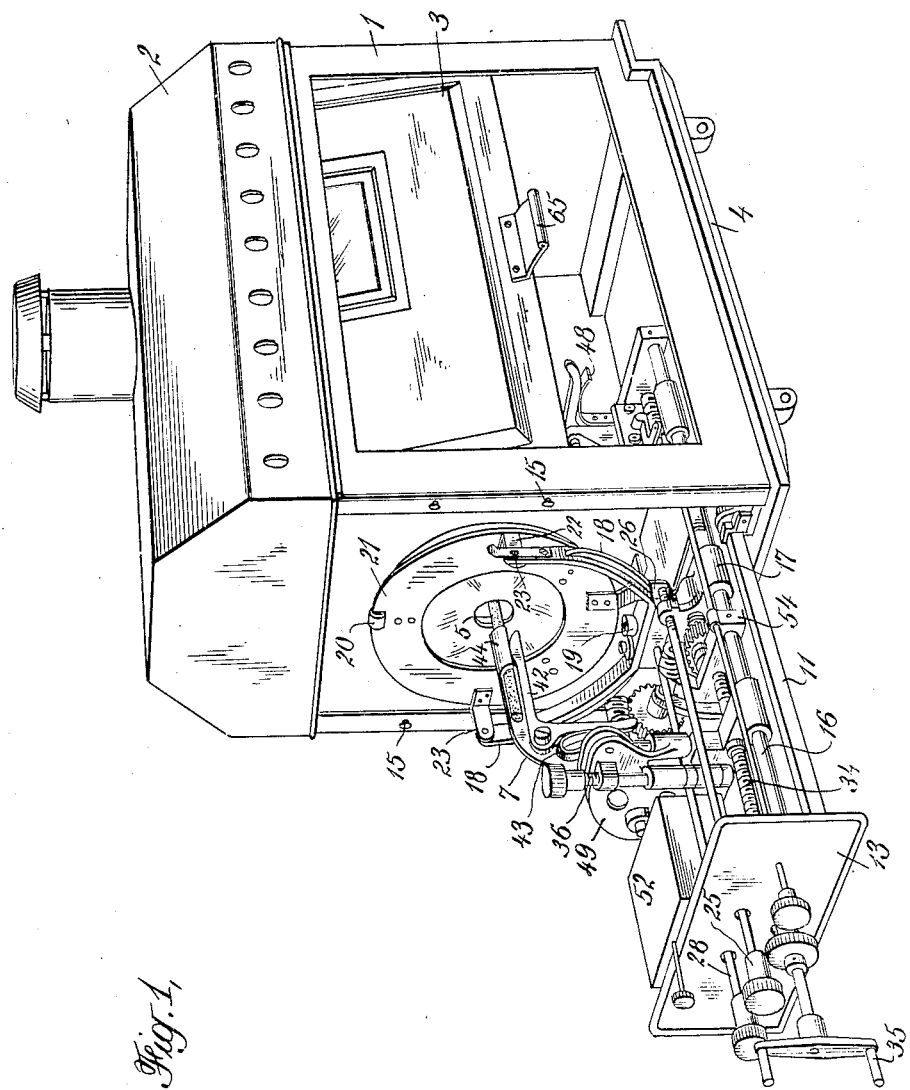

Dec. 3, 1929.  L. W. BOWEN  1,737,993
PROJECTION APPARATUS
Filed Aug. 28, 1925   4 Sheets-Sheet 1

INVENTOR
Lester W. Bowen
BY
Dallas R. Lamont
ATTORNEY

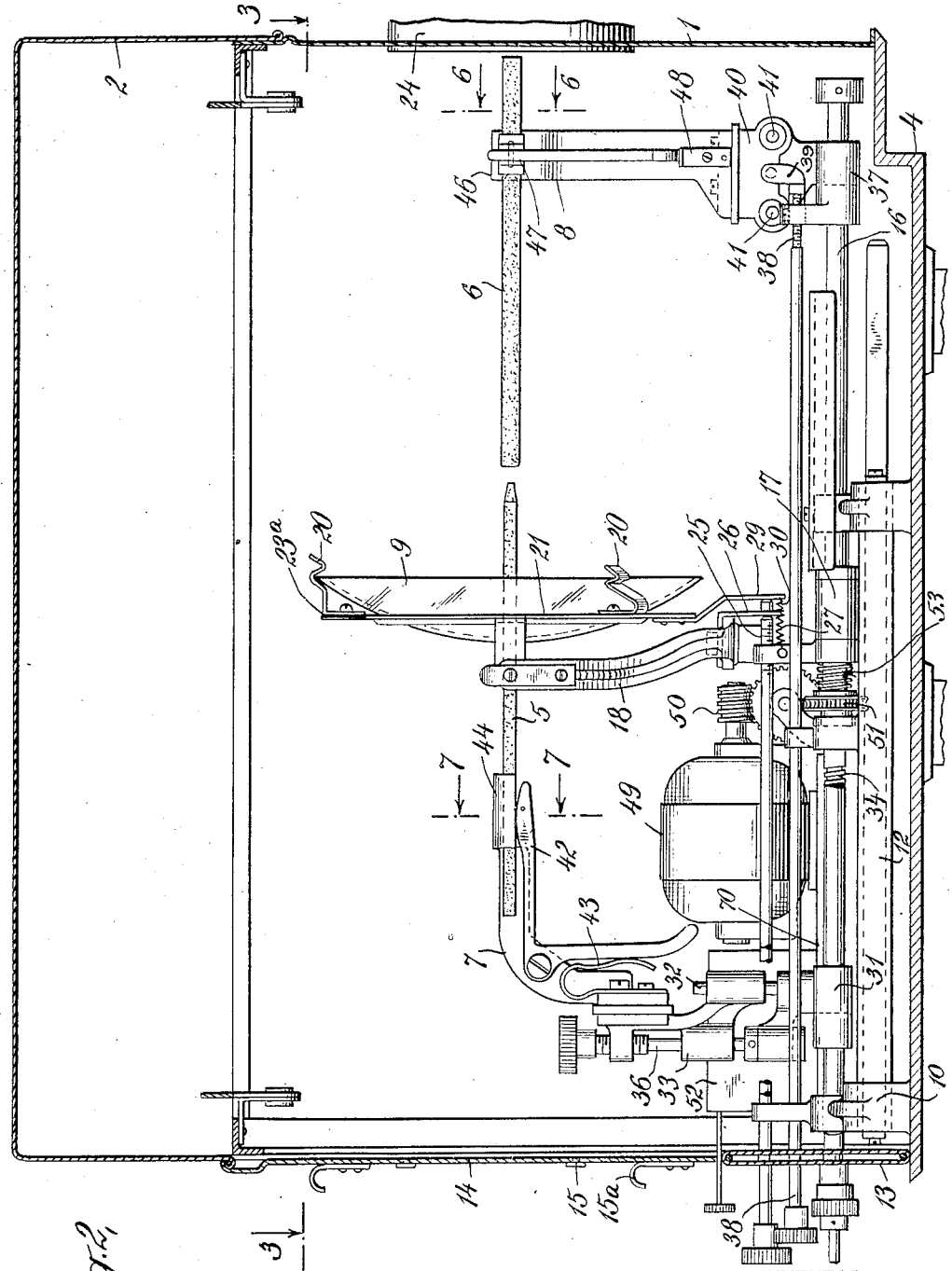

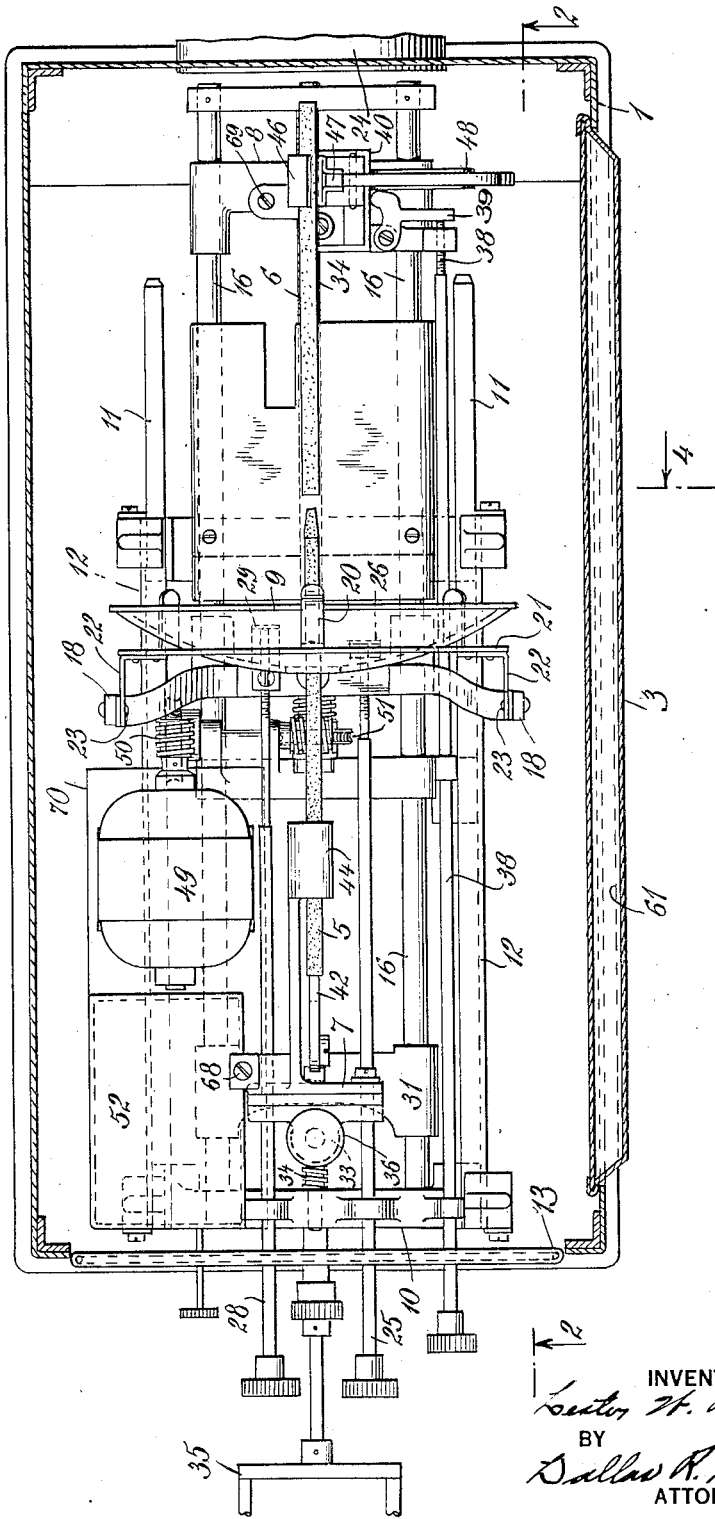

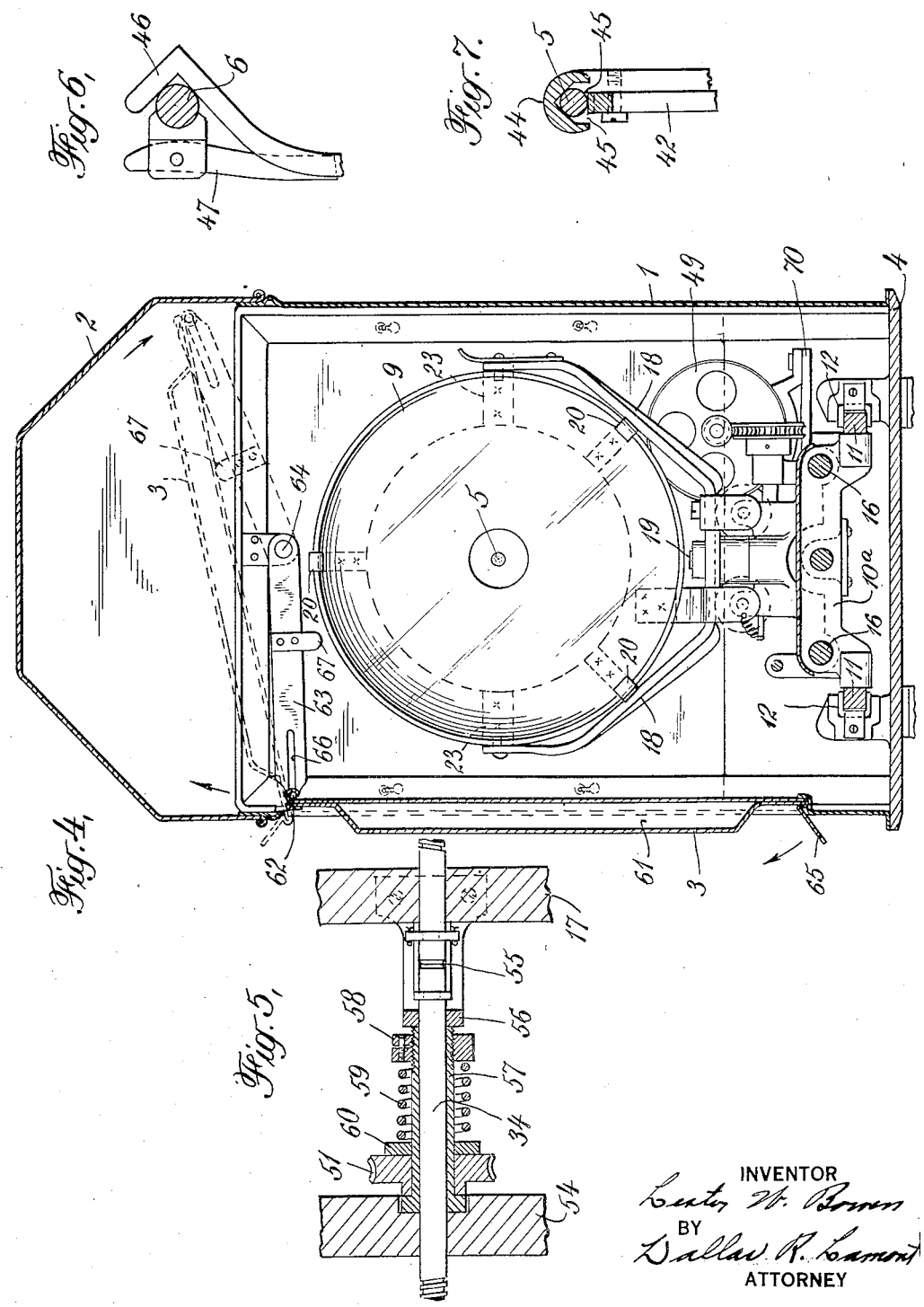

Patented Dec. 3, 1929

1,737,993

UNITED STATES PATENT OFFICE

LESTER W. BOWEN, OF HASBROUCK HEIGHTS, NEW JERSEY, ASSIGNOR TO GRIFFEN & BOWEN, INC., OF NEW YORK, N. Y., A CORPORATION OF NEW YORK

PROJECTION APPARATUS

Application filed August 28, 1925. Serial No. 53,022.

This invention relates to motion picture projecting apparatus and has to do particularly with the structure of the lamphouse and the light generating unit.

Motion picture projectors of the type commonly employed in theatres consist essentially of a projector light together with its associated mechanism, a film feeding mechanism and a supporting structure for these parts. The film feeding mechanism ordinarily constitutes a separate unit and includes the projector aperture past which the film is moved intermittently during projection. The projector light is an incandescent filament lamp or electric arc lamp contained in an enclosing structure known as the lamphouse located behind the projector aperture. In the case of an arc lamp appropriate means for adjusting the position of the arc, feeding the electrodes and the like are provided. The electrodes of the arc are located in such fashion that the luminous crater on the positive electrode faces as nearly as possible toward the front of the projector and thus constitutes the light source for the apparatus. Condensing lenses are provided to receive the light from the arc and converge it upon the projector aperture to thus illuminate the picture for projection upon the screen.

The type of projecting light most widely used in motion picture apparatus is the ordinary direct current carbon electrode arc. This type of light source is subject to a particular limitation, however, in that the intensity of the light which can be generated at the arc is definitely limited and therefore the amount of light which can be produced by the arc and the quantity of light per unit area which can be obtained at the projector aperture is correspondingly restricted. The result is that a projector employing this type of arc is rather definitely restricted as to the size of picture, length of throw, brightness of picture, etc., which can be obtained from it. To overcome the inherent limitations of the ordinary carbon electrode direct current arc the so-called high intensity arc has been developed. This type of arc employs specially prepared electrodes of such nature that the temperature in the crater of the positive electrode is considerably greater than the combustion temperature of carbon with the result that a light source of higher intensity is secured and a greater intensity of illumination, that is, a greater amount of illumination per unit area can be obtained at the aperture. The high tensity arc is, however, open to a number of important practical objections such as excessive current consumption, rapid burning away of the electrodes, necessity of providing special connections to introduce the current at the tip of the electrodes and the like.

One of the objects of the present invention is to utilize the light from the arc lamp more efficiently than is done in the ordinary type of projector so that with a given light source a much greater total amount of light will be available for effective use in the projection of the picture or, conversely, an equal or greater amount of light may be obtained at the screen from a much less powerful light source. This is accomplished principally by providing a suitable reflector at the rear of the arc and properly constructing and arranging the cooperating parts of the apparatus. The carbons of the arc are positioned so that the luminous crater of the positive carbon faces the reflector, and the reflector is designed to cover a wider angle than can practically be covered when the ordinary condenser system is employed. In this way three or four times as much light can be gathered from the light source and effectively used. Tests show that the present apparatus as designed for commercial use employing about 28 amperes through the arc projects to the screen about 25% more light than can be obtained from the ordinary direct current arc projector with a current of about 95 amperes, which value of current produces the practicable maximum amount of light.

Motion picture projectors of the reflector type have been proposed heretofore, and such projectors have been used commercially to a certain extent both in this country and abroad. These reflector type projectors have been designed principally with the idea of effecting an economy in power consumption, and in fact do furnish reasonably satisfactory projection at very considerable savings over the cost of operation of the ordinary direct current projector arcs. The present apparatus, however, not only affords as good projection at reduced cost as does the ordinary direct current arc, but furnishes for effective use in projection a greater amount of light than can possibly be obtained in the ordinary direct current arc projector. The result is that the present apparatus may advantageously be used wherever the direct current arc projector has heretofore been used and in addition may be used to obtain a brighter picture, a larger picture, a longer projection throw, or the like, than is possible with the ordinary type of projector.

It is the principal object of this invention to provide a lighting unit and lamphouse structure for motion picture projectors having the advantages just referred to and which at the same time embodies certain novel features of construction, design and operation which render the apparatus superior to apparatus of this general class which has heretofore been proposed. No claim is made in this application to the broad fundamental principles upon which the operation of the apparatus is based for the reason that such fundamental principles have long been known in the art. The invention resides rather in those various specific features which serve to improve the general operation of the apparatus, afford a better projection of the picture, make for convenience and reliability of operation and in general enhance the commercial utility of the apparatus. Among such features may be mentioned the combined automatic and manual carbon feed mechanism, the particular construction for effecting quick bodily removal of the lighting unit from the lamphouse, the mounting arrangement of the parts constituting the removable unit, the particular construction of the carbon holders which permits easy replacement of the carbons, the adjustments for the carbon holders by means of which the carbons may be aligned and carbons of different sizes may be used without sacrificing the alignment of the carbons or disturbing the position of the arc, the construction of the reflector unit and the adjustment provided for it, the arrangement whereby adjustments may be accomplished from the exterior of the lamphouse, the novel type of door in the side of the lamphouse together with its associated mechanism, and the like.

The accompanying drawings illustrate a preferred embodiment of the invention. In said drawings, Figure 1 is a perspective view of a motion picture projector lamphouse embodying the invention, the removable element being partially withdrawn from its housing; Figure 2 is a vertical sectional view taken centrally through a lamphouse structure embodying the invention; Figure 3 is a horizontal sectional view taken on line 3—3 of Figure 2; Figure 4 is a vertical sectional view taken widthwise of the apparatus along line 4—4 of Figure 3; Figure 5 is a detail view of a portion of the carbon feeding mechanism; and Figures 6 and 7 are detail sectional views taken on lines 6—6 and 7—7, respectively, of Figure 2 showing the construction of the two carbon holders.

Referring to the drawings, 1 indicates the lamphouse which constitutes the enclosing structure for the projector light and its associated mechanism. The lamphouse 1 is provided with the usual removable cover 2 having in it suitable openings which insure an appropriate circulation through the apparatus of cooling and ventilating air. The cover 2 is specially designed so that it will permit opening of the sliding door 3 into the position shown in dotted lines in Figure 4. The lamphouse 1 as here shown is provided with a base member 4 of such construction as to fit directly upon the lamphouse support of the motion picture projector known to the trade as "Power's projector". It will be understood that the base member 4 may be variously modified so that the lamphouse structure of this invention may be applied to any of the commercial motion picture projectors which are available on the market and may thus be directly used in lieu of the lamphouse structure and lighting unit ordinarily supplied by the manufacturer. All of the professional type projectors which are being marketed in this country at the present time employ a lamphouse structure separate from the rest of the apparatus but in these various machines the support or stand upon which the lamphouse rests varies in distance below the optical axis of the projector as determined by the objective lense and projector aperture of the machine. Of the commercial professional type projectors at present on the market the one known to the trade as "the Simplex" employs a lamphouse support which is the least distance below the optical axis. For this reason the present lamphouse structure has been designed to fit directly upon the Simplex stand and a series of detachable bases or adapters have been designed to render possible the direct application of the present lamphouse structure to the other makes of professional projectors. The fashion in which this is accomplished is illustrated by the construction of the base member 4, which, as may be seen by a comparison between Figure 1 and Figure 2 consists of a removable element which fits directly upon the bottom of the normal lamphouse structure. By this arrangement the position of the arc on the optical axis of the projector is assured. The arc is rigidly supported at a fixed height within the lamphouse and since the adapting bases are designed to position the lamphouse at the proper height on the different types of projectors, the proper position of the arc is assured as a matter of course without necessity for adjustment.

The lighting unit is removable bodily from the lamphouse. The removable unit includes the arc light consisting of carbon electrodes 5 and 6 together with suitable holders 7 and 8 for the respective carbons, the reflector 9 together with its supporting members, the various mechanism for controlling and feeding the carbons and the adjusting mechanism for the carbons and the reflector. Frame member 10 and 10ª extend transversely of the apparatus and constitute a part of the supporting structure. Secured to the frame members are two horizontally extending bars 11, one at each side of the element. The respective bars 11 engage with channel members 12 extending along the length of the lamphouse 1 near its bottom so that the bars may be reciprocated along the length of the channels, thus furnishing a means whereby the entire lighting unit may be withdrawn partially or entirely from the lamphouse by merely drawing it out at the rear of the apparatus after the fashion shown in Figure 1. The construction affords the necessary rigidity to the removable unit. The frame members 10 and 10ª extend between the supporting bars 11 so that the members 10 and 10ª taken with the bars 11 constitute supporting structure for the parts of the removable element. This rigidity of structure is essential in the construction of a relatively large and heavy removable unit of the type required in the present apparatus. It has been heretofore proposed in motion picture projectors of small size involving no automatic control and feed mechanism for the carbons and the like to mount the carbons and carbon supports on as a part of a removable element having a pair of rods which telescope into sleeves provided on the lamphouse and thus establish a sliding connection between the lamphouse of the removable unit. This structure is, however, open to a number of serious objections. Among these may be mentioned the fact that the supporting rods can have an attachment to the body portion of the removable element only at one end with the result that the removable unit is lacking in rigidity and ruggedness and the weight of unit which it is possible to carry without excessively stressing the parts is seriously limited. In the present structure each of the supporting bars 11 has a rigid connection with the frame of the removable element at two points along its length, this connection being made at the inner face of the bars 11 so that the connection will not interfere with the engagement of the bars 11 and the channel track member 12. The rear wall of the lamphouse 1 is composed of two sections, one of which is the section 13 carried by the removable element and the other of which is the section 14 which covers that portion of the end of the projector between the top of the section 13 and the lower edge of the cover 2. The section 14 of the end wall is provided with slots which fit over pins 15 on the lamphouse, thus serving to hold the piece 14 in place. Handles 15ª are provided for convenience in quickly removing the section 14 when desired. In order to withdraw the removable unit from the lamphouse it is merely necessary to lift up on the handles 15ª and remove the section 14 of the end wall whereupon the entire removable element may be slid out at the end of the lamphouse with a single motion.

The frame member 10 also carries a pair of rods 16 which extend in parallelism along the length of the removable unit and constitute the supporting members upon which the respective carbon holders and the reflector are mounted. A base member 17 for the reflector support is mounted upon rods 16 and is maintained in fixed position relative to the length of these rods. The base member 17 carries the reflector support 18 which is secured to the base member through the medium of a vertical pivot rod 19 about which rod the reflector support may be turned to thus adjust the focus of the reflector transversely of the apparatus. The reflector element 9 is carried by three spring supports 20 spaced at intervals around the outer edge of the reflector and secured to an annular ring 21 which is provided at the extremities of its horizontal diameter with supporting lugs 22 having pivotal connections 23 with the upper ends of the reflector supporting arms 18. These pivotal connections 23 permit the reflector to be tilted about a horizontal transverse axis to thereby adjust the focus of the reflector in a vertical direction. If desired only one of the three supports 20 need be a spring support, two of the supports being rigid while the third support is a resilient material and serves as a latch to admit the reflector unit into operative position and to retain it in such fashion. Blocks of insulating material 23ª are provided between the reflector supports 23 and the annular reflector supporting ring 21. This precaution is desirable for the reason that a carbon or its carbon holder may contact with the reflector in passing through the central aperture provided in the reflector and since the reflector is silvered such contact might result in a short circuit if the reflector were not insulated from the ground.

The reflector is a plain spherical reflector, or preferably a spherical reflector corrected to compensate for spherical aberration. The carbon electrodes 5 and 6 are so positioned that the arc is located at some little distance in front of the reflector. In practical operation it is possible to obtain such a relation between the reflector and the arc that the reflector subtends approximately a 100 degree solid angle considering the positive crater as the source with the result that approximately 75% of the total amount of light emitted by the arc is intercepted by the reflector. The reflector is so designed that it converges the light received by it into a concentrated beam directed upon the projector aperture. A light opening 24 is provided at the front of the lamphouse through which this beam may pass to the aperture. No condensing lenses are required. The position of the beam cast upon the projector aperture by the reflector 9 may be adjusted by adjusting the position of the reflector. Rotation of the reflector support about the vertical pivot 19 to effect a lateral adjustment of the beam is accomplished through the medium of the adjusting screw 25 at the rear of the lamphouse. This screw is threaded into the stationary member 17 and abuts at its inner end against the projection 26 secured to the reflector support 18. The projection 26 is held in contact with the adjusting rod 25 by means of spring 27. Thus, by turning the adjusting screw 25 it is caused to move longitudinally of the element with the result that the reflector support 18 may be turned a desired amount about its pivot 19 to effect lateral adjustment of the beam of light projected by the reflector. Vertical adjustment of the light beam is accomplished by adjusting screw 28 which is also threaded through member 17 and abuts against a projection 29 depending from the annular reflector supporting ring 21. A spring 30 serves to hold the projection 29 in contact with the inner end of the adjusting screw 28. Thus rotation of the adjusting screw 28 moves the screw longitudinally of the apparatus and serves to tilt the reflector about its horizontal pivots 23, and thus effect vertical adjustment of the light beam.

The carbon holders 7 and 8 are also carried upon rods 16. The rear carbon holder 8 comprises a base member 31 slidably mounted upon rods 16 and having an upwardly extending shaft portion 32 upon which is mounted for vertical sliding movement a second member 33 which in turn carries the carbon engaging portion of the carbon holder 7. The current connection to the carbon holder 7 is established by securing the lead wire coming from the mains to the contact block 68. The base member 31 is traversed by the adjusting screw 34 which extends centrally along the entire length of the removable unit and terminates in a handle 35 at the exterior of the apparatus by means of which longitudinal adjustment of the carbons may be effected. By rotating the adjusting screw 34 the base member 31, together with the carbon holder and other parts carried by it, is caused to move along rods 16 with the result that the carbon 5 is shifted in the direction of its length. Vertical adjustment of the carbon 5 is effected through the medium of an adjusting screw 36 secured against longitudinal movement in the base member 31 and threaded through member 33 so that upon rotation of the screw 36 vertical movement of the member 33 upon the shaft 32 will occur, thus shifting the carbon holder and carbon in a vertical direction. The support for the forward carbon 6 comprises a base member 37 slidably mounted upon rods 16. This base member 37 is also traversed by the adjusting screw 34, but the end of the screw 34 which passes through member 37 is threaded oppositely from the end which passes through member 31 of the rear carbon support. Thus upon rotation of the adjusting screw 34 the respective carbons are moved simultaneously toward each other or away from each other depending upon the direction of rotation of the adjusting screw. Lateral adjustment of the carbon 6 is effected by adjusting screw 38 which operates a bell crank lever 39 and serves to shift the portion 40 of the carbon support laterally upon rods 41. Current is supplied to the carbon through the medium of contact block 69 provided on the carbon support.

The carbons 5 and 6 extend lengthwise of the apparatus and are arranged horizontally so that the crater of the positive carbon 6 faces the reflector 9. The rear carbon 5 extends through a hole in the center of the reflector and is put in place by inserting it through the hole from the rear of the reflector. The carbon 5 is retained in the holder by means of a lever arm 42 which is pressed into closed position by spring 43. The upper part of the carbon holder, as best shown in Figure 7, consists of a member 44 of generally semi-cylindrical conformation which receives the carbon 5. The retaining arm 42 which holds the carbon in place is of relatively narrow width so that upon slightly opening arm 42 the space indicated at 45 in Figure 7 becomes large enough to permit withdrawal of the carbon. The carbon may therefore be lifted out or inserted at the side of the carbon holder without necessity of threading the entire length of the carbon through the holder in order that it may be placed in operative position. If carbons of different sizes are employed the center of the carbon will shift vertically but will remain in the same position laterally, and for this reason the rear carbon support is provided with a vertical adjustment. The forward carbon holder 8, as shown in Figure 6, consists of a socket portion 46 for holding the carbon and a retaining arm 47 urged into closed position by spring 48 for securing the carbon in place. By employing this construction it is possible to lift the carbon out of the holder or place the carbon in the holder without necessity of threading it through the holder along its entire length. The use of different sizes of carbons in this forward carbon holder will cause the carbon center to shift transversely of the apparatus and this may be compensated for by the lateral adjustment provided for this carbon holder. The carbons employed are of such composition and size that the burning rates of the two carbons are substantialy equal. As the carbons burn the adjusting screw 34 is rotated and the carbons are fed together at an appropriate rate and, since the burning rates are substantially equal, the position of the arc with respect to the reflector will not be substantially changed. This longitudinal feeding of the carbons is accomplished automatically. An electric motor 49 drives adjusting screw 34 through the medium of the worm and wormwheel reduction gearing indicated generally at 50 and 51. The wormwheel indicated at 51 is mounted on the adjusting screw 34 and has a driving connection with it so that upon rotation of the motor 49 the shaft 34 will be rotated at a reduced speed. The motor is actuated by a control mechanism indicated generally at 52 whose action depends upon both the voltage and current conditions at the arc. This control mechanism forms the subject of my co-pending application Serial No. 93,377 and for that reason is not here shown in detail. The control mechanism actuates the motor so that it feeds the carbons in such fashion as to maintain uniform voltage and current conditions at the arc. The control system is responsive to minute variations in arc conditions and thus the motor feeds the carbons frequently in small increments and maintains a uniform arc at all times without necessity of attention on the part of the operator. The motor 49 and the control unit 52 are mounted on a common plate or support 70 so that these two elements are detachable from the apparatus as a unit. Both of these elements are carried by the removable unit and are themselves removable from this unit. The worm 50 secured to the motor shaft is detachable with the motor unit and to establish a driving connection when the motor and control unit are returned to operative position it is merely necessary to effect an engagement between the worm 50 and its cooperating wormwheel, which connection is established when the motor 49 is fitted into its proper place on its support.

The adjusting screw 34, while normally motor driven, may be operated manually through the medium of the handle 35 without interfering with the motor drive. This is accomplished by means of the special clutch mechanism indicated generally at 53 and shown in detail in Figure 5. Referring to Figure 5, the shaft of the adjusting screw 34 is seen to extend through the frame members 17 and 54 as a continuous shaft, the splicing in the shaft indicated at 55 being resorted to solely for convenience in assembly. Fixed to the member 17 is a spacing member 56 which holds in place a sleeve 57 extending around a portion of the shaft 34 and being threaded at one end to receive a retaining nut 58 which may be adjusted to exert a desired pressure upon spring 59. Spring 59 at one end bears against a collar 60 which in turn lies adjacent the wormwheel 51 which is rotatable on the sleeve 57. During normal operation when the carbons are motor driven the motor 49, through its gearing, drives wormwheel 51 and the frictional engagement between the wormwheel and the collar 60 is sufficient so that the entire clutch mechanism including the spring 59 and the sleeve 57 rotates. The sleeve 57 is fixed to the shaft of screw 34 and thus the motor effects rotation of the screw.

During manual operation of the screw 34, the screw is turned directly through the medium of the handle 35. Since the wormwheel 51 and its cooperating worm constitute an irreversible gearing the manual rotation of screw 34 is not transmitted back through the chain of gearing to the motor but rather the manual effort exerted on the shaft 34 overcomes the friction between the parts of the clutch and effects rotation of the sleeve 57 and its associated parts while the wormwheel 51 remains stationary. Thus manual adjustment of the carbons may be accomplished at any time without interfering with the motor drive.

In the operation of the apparatus the carbons are set so that their abutting ends will occur at the proper position with respect to the reflector 9. The proper setting may be determined by a mark placed upon the frame of the apparatus directly beneath the proper position of the arc so that the projectionist may readily set the carbons so that their ends come in contact directly above this mark. When the proper setting is obtained the carbons may be brought together to strike the arc by means of the manual adjusting handle 35. They may be backed away from each other rapidly by means of the manual adjustment to approximately the proper distance whereupon the automatic feeding mechanism will adjust them to obtain the proper character of arc and will maintain a proper arc without further attention.

A feature of particular importance in the present apparatus is the door 3 in the side of the lamphouse which affords ready and convenient access to the lighting unit. The door 3 is preferably a double walled structure which provides an air space 61 within the door for heat insulating purposes. The upper edge of the door is pivoted at its respective ends as indicated at 62 to a link 63 which swings about a pivot 64 secured to the frame of the lamphouse. When the door is raised by exerting an upward pull on the handle 65 at the lower edge of the door, the link 63 swings upwardly about its pivot 64 until the parts assume the positions indicated in dotted lines in Figure 4. The lamphouse cover 2 is of such construction as to permit the swinging of the door and to afford room for the door in its open position. The end of the link which connects with the door is provided with a slot 66 for the purpose of allowing the door to slant inwardly when it is raised into open position and thus allow the extended outer wall of the door to clear the frame of the lamphouse. This effect is obtained because when the upward pull is exerted on the door handle 65 the upper end of the door tends to swing inwardly so that the points 62 of attachment between the door and the link will follow along toward the inner end of the slot 66 and will then afford ample clearance for the opening of the door. In order to hold the door in its open position the link 63 is provided with a stop 67 upon which the door may rest when in open position in the fashion indicated in dotted lines in Figure 4.

The present invention, therefore, resides in the improved features of construction, design, arrangement and operation which have been outlined above. The present apparatus produces a picture superior to that produced by the ordinary direct current arc lamp projector at a current consumption of only one third or one fourth that required in the ordinary projector, and projects to the screen an amount of light greater than that which can be obtained from the ordinary projector. This results in a notable saving in the cost of power. The apparatus, by reason of its arrangement and design, offers many advantages such as convenience of manipulation and the like which are of particular importance from the viewpoint of the projectionist. The compact arrangement and the design of the various component parts of the apparatus make possible the manufacture of a rugged, reliably operating apparatus of good appearance at a minimum production cost.

I claim:

1. An arc lighting unit of the class described for motion picture projectors contained within the lamphouse of the projector which comprises a frame portion and supporting bars rigidly associated with said frame portion and constituting essentially a part thereof, said bars having a sliding engagement with the lamphouse, whereby the lighting unit may be shifted bodily with respect to the lamphouse, guide members extending longitudinally of said lighting unit, electrode holders mounted for longitudinal movement with respect thereto, and adapted to carry the electrodes in end to end parallel relation, adjusting means for effecting such movement of said electrode holders, means for independently adjusting one of said electrode holders in a vertical direction, and means for adjusting the other of said electrode holders in a horizontal direction, whereby alignment of the electrodes with their longitudinal axes in the same straight line is effected.

2. An arc lighting unit of the class described for furnishing the projecting light for a motion picture projector which comprises a frame portion, members rigidly associated with said frame portion having a sliding engagement with the lamphouse within which the lighting unit is housed whereby relative displacement of said lighting unit and said lamphouse may be effected, guide rods constituting a part of said lighting unit, a reflector support normally fixed upon said rods but having a limited movement thereon for permitting initial longitudinal adjustment, a reflector supporting bracket carried by said reflector support rotatable about a vertical axis upon said support for effecting horizontal adjustments of the light beam projected by said reflector, a reflector carrying member tiltable vertically with respect to said reflector support for effecting vertical adjustment of the light beam projected by said reflector, and reflector holding members associated with said reflector carrying member for engaging and holding the reflector, one of said holding members being resilient whereby the reflector may readily be inserted or withdrawn.

3. An arc lighting unit of the class described for motion picture projectors which comprises a frame portion, members rigidly associated with said frame portion having a sliding engagement with the stationary parts of the projector lamphouse, whereby relative displacement of said lighting unit and said lamphouse may be effected, guide rods constituting a part of said lighting unit, electrode supports slidably mounted upon said rods, a driving screw threaded through said electrode supports and having oppositely threaded portions engaging said respective supports, means for manually operating said screw from the exterior of the apparatus, a reflector support normally fixed upon said rods but having a limited movement thereon for permitting initial longitudinal adjustment, a reflector supporting bracket rotatable about a vertical axis fixed in said reflector support and having arms extending up at the respective sides of said reflector, whereby horizontal adjustment of the reflector beam may be effected, an annular ring having a pivotal connection with the arms of said bracket whereby said ring may be tilted about a horizontal axis to thus adjust the reflector beam in a vertical direction, reflector holding members spaced about said ring for engaging and holding the reflector, electrically insulating material placed between said reflector holding members and said ring and adjusting means operable from the exterior of said housing for effecting the horizontal and vertical adjustments of the reflector beam.

4. An arc lighting unit of the class described for motion picture projectors which comprises means of engagement between said lighting unit and the lamphouse of the projector, whereby said lighting unit is rigidly supported in fixed position within the lamphouse, but may be bodily shifted relative to said lamphouse, guide rods carried by said lighting unit, a reflector support carried by said rods, a supporting bracket carried by said reflector support mounted to swing in a horizontal plane, an adjusting screw manually operable from the exterior of the lamphouse for turning said bracket in one direction, a spring tending to turn said bracket in the other direction and urging said bracket into its limiting position as determined by said adjusting screw, a reflector carrying member tiltable vertically with respect to said bracket, an adjusting screw annually operable from the exterior of the lamphouse to tilt said reflector carrying member in one direction, a spring tending to tilt said reflector carrying member in the other direction and urging said member into its limiting position as determined by said adjusting screw, and reflector holding members associated with said carrying member for engaging and holding the reflector, whereby the reflector beam may be universally adjusted from the exterior of the lamphouse.

5. An arc lighting unit of the class described for motion picture projectors comprising a member constituting a rigid essentially integral part of the said lighting unit and having a sliding engagement with the lamphouse of the projector, whereby the lighting unit is shiftable bodily relative to the lamphouse, guide rods carried by said lighting unit, electrode supports slidably mounted on said guide rods, electrodes carried by said supports, a longitudinally fixed driving member extending through said respective electrode supports and having oppositely threaded connections with said supports whereby said electrode supports are simultaneously adjustable toward each other or away from each other, means for independently adjusting one of said electrodes in a vertical direction comprising a member slidable vertical with respect to the electrode support and an adjusting screw fixed longitudinally in said support and having a threaded connection with said vertically movable portion and a carbon gripping member carried by said vertically moving portion and means for adjusting the other of said electrodes in a horizontal direction comprising a member horizontally movable relative to the electrode support, an adjusting member operable from the exterior of the lamphouse for urging said portion in one direction, a spring for urging said portion in the other direction into its limiting position as determined by the position of said adjusting member and an electrode gripping member carried by said horizontally adjustable portion.

6. An arc lighting unit of the class described for motion picture projectors, comprising a member rigidly associated with the rest of the unit and having a sliding engagement with the lamphouse portion of the projector, whereby the lighting unit is shiftable bodily relative to the lamphouse, guide rods constituting a part of said lighting unit, an electrode support slidably mounted on said guide rods, an electrode holder associated with said support comprising an electrode engaging member movable in a plane parallel to the axis of the electrode to clamp the electrode in place in the holder, means for adjusting said electrode holder in a vertical direction, a second electrode holder slidably mounted on said guide rods comprising an electrode engaging member movable in a plane perpendicular to the axis of the electrode, means for adjusting the electrode holder in the direction of said plane and means for adjusting the respective electrodes in the direction of their length.

In testimony whereof I affix my signature.

LESTER W. BOWEN.